US006762884B2

(12) United States Patent
Beystrum et al.

(10) Patent No.: US 6,762,884 B2
(45) Date of Patent: Jul. 13, 2004

(54) ENHANCED NIGHT VISION GOGGLE ASSEMBLY

(75) Inventors: Timothy R. Beystrum, Phoenix, AZ (US); Michael D. Waterman, Chandler, AZ (US); William R. Boryshuk, Mesa, AZ (US); Antonio V. Bacarella, Dallas, TX (US); Timothy B. Hogan, Irving, TX (US); Rodney L. Doster, Garland, TX (US)

(73) Assignee: Litton Systems, Inc,, Los Angeles, CA (US)

( * ) Notice: Subject to any disclaimer, the term of this patent is extended or adjusted under 35 U.S.C. 154(b) by 0 days.

(21) Appl. No.: 10/250,052

(22) Filed: May 30, 2003

(65) Prior Publication Data

US 2004/0042086 A1 Mar. 4, 2004

Related U.S. Application Data

(60) Provisional application No. 60/319,296, filed on Jun. 5, 2002.

(51) Int. Cl.[7] .............................................. G02C 27/14
(52) U.S. Cl. ....................................... 359/629; 359/634
(58) Field of Search ................................ 359/618, 629, 359/630, 634, 350, 353

(56) References Cited

U.S. PATENT DOCUMENTS

| 4,463,252 | A | 7/1984 | Brennan et al. ...... 250/214 VT |
| 4,602,861 | A | 7/1986 | Taniguchi et al. ............ 396/81 |
| 4,679,068 | A | 7/1987 | Lillquist et al. ............... 348/33 |
| 4,751,571 | A | 6/1988 | Lillquist ...................... 348/164 |
| 5,035,472 | A | 7/1991 | Hansen ........................ 359/350 |
| 5,229,592 | A | 7/1993 | Horwitz et al. .......... 250/201.9 |
| 5,557,451 | A | 9/1996 | Copenhaver et al. ........ 359/350 |
| H1599 | H | 10/1996 | Task et al. ..................... 348/33 |
| 5,729,010 | A | 3/1998 | Pinkus et al. ......... 250/214 VT |
| 5,760,827 | A | 6/1998 | Faris ........................... 348/42 |
| 5,910,816 | A | 6/1999 | Fontenot et al. .............. 348/65 |
| 6,195,206 | B1 * | 2/2001 | Yona et al. ................. 359/630 |
| 6,252,719 | B1 * | 6/2001 | Eichenbaum ............... 359/634 |
| 6,560,029 | B1 | 5/2003 | Dobbie et al. ............... 359/631 |

FOREIGN PATENT DOCUMENTS

WO    WO 01/72033 A1    9/2001

\* cited by examiner

Primary Examiner—Huy Mai
(74) Attorney, Agent, or Firm—Marsteller & Associates, P.C.

(57) ABSTRACT

A system (S) for combining multi-spectral images of a scene includes a channel (18) for transmitting a scene image (10) in a first spectral band. A separate, second detector (22) senses the scene in a second spectral band. The second detector (22) has an image output that is representative of the scene. A display (28) displays an image (12) in the second spectral band. A beam mixer (30) combines the image output (10) in the first spectral band with the displayed image (12), and conveys the combined multi-spectral images to an output (32) for a user (U).

15 Claims, 3 Drawing Sheets

ENHANCED NIGHT VISION GOGGLE ASSEMBLY

CROSS REFERENCE TO RELATED APPLICATIONS

This application claims the benefit of U.S. Provisional Application Serial No. 60/319,296, filed Jun. 5, 2002, entitled ENHANCED NIGHT VISION GOGGLE ASSEMBLY.

BACKGROUND OF INVENTION

1. Technical Field.

The invention relates to the field of night vision devices, and particularly to a system for combining images from an image intensifier and an infrared camera system.

2. Background Art.

Standard night vision is enhanced with the addition of IR information. Whereas typical night vision devices (image intensifiers) can only see visible wavelengths of radiation, the fused system provides additional situational awareness by providing infrared (heat) information to the image. A typical scenario where this might be important is in a situation where a person is camouflaged and cannot be seen with image intensification. However, with the addition of infrared information to the same image, the camouflaged person's heat signature is seen. Typical infrared night vision devices do not have sufficient resolution and sensitivity to provide good imagery of the full environment being looked at. Use of overlay image intensification (II) and infrared radiation (IR) fusion provides benefit of II resolution and environment awareness with benefit of infrared signatures, smoke penetration, etc.

Generally, there are two alternative methods of fusion: digital fusion and analog fusion.

Previous designs for combining images have used a dichroic beam splitter. The image intensifier image would pass directly through the beam splitter while the infrared image projected by a display would reflect off the beam splitter and merge onto the image intensifier image.

One technique known for combining an infrared image with an image displayed at visible wavelengths is described in U.S. Pat. No. 4,751,571 to Lillquist. The system disclosed in this patent has two separate image paths. One path transmits visible light to an image intensifier while a second path transmits thermal IR to an IR detector. Both the intensified image and the IR image are converted to electronic video signals. The two electronic signals are then mixed at a video mixer and then displayed on a color monitor. The technique described in the Lillquist patent has the disadvantage of requiring that both signals be electronically converted and electronically combined before being displayed to a user. Such electronic conversion will lose the very high resolution of the image intensified night vision device. Additionally, the Lillquist approach requires a dedicated system not usable with the vast population of existing night vision devices.

Another image fusion system is described in U.S. Pat. No. 5,035,472 to Hansen. This patent describes a device that conveys the image along two separate paths. One path directs the image to an IR detector which produces an IR image. The IR image is then transmitted to a CRT which displays the image. A second path directs the image of the scene to an image intensifier tube which generates an intensified image which also produces a visual display of the image. The displayed IR and intensified images are optically combined for display to a user. The technique described in the Hansen patent requires both images to be visibly generated before they are optically combined behind the image intensifier. This approach has the disadvantage of requiring a dedicated system not usable with the vast population of existing night vision devices.

Another technique calls for detecting a scene using multiple sensors which convert the images to digital data and then algorithmically combine the data using microelectronic processors. The disadvantages of this approach are that it is time consuming, requires substantial processing power, and the high resolution of a night vision channel cannot be captured electronically.

While the above cited references introduce and disclose a number of noteworthy advances and technological improvements within the art, none completely fulfills the specific objectives achieved by this invention.

SUMMARY OF INVENTION

In accordance with the present invention, a system for combining multi-spectral images of a scene includes a channel for transmitting a scene image in a first spectral band. A separate, second detector senses the scene in a second spectral band. The second detector has an image output that is representative of the scene. A display displays an image in the second spectral band. A beam mixer combines the image output in the first spectral band with the displayed image, and conveys the combined multi-spectral images to an output for a user.

An object of the present invention is to provide a means to-fuse an image intensifier and an IR camera image using optical overlay methods while minimizing the weight, size, form factor, goggle forward projection of the night vision goggle assembly.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
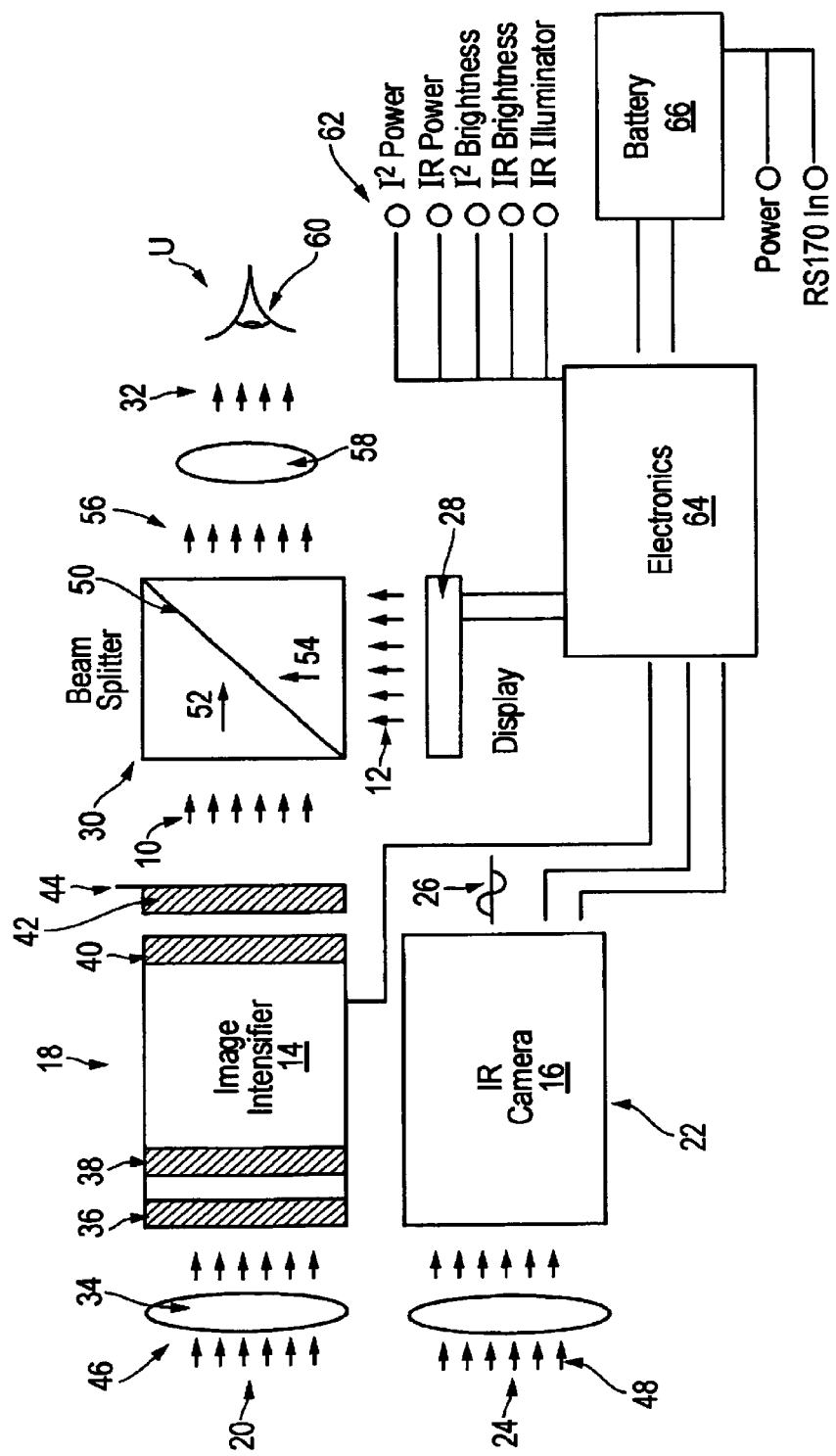
FIG. 1 is a block diagram for the system of the present invention.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

The present invention describes a night vision system or device S that provides fusion of two images 70, 12 originating from an image intensifier 14 and an infrared camera 16.

The system S for combining multi-spectral images of a scene includes a first channel or detector 18 for transmitting a scene image 20 in a first spectral band. A separate, second detector 22 senses the scene 22 in a second spectral band. The second detector 22 has an electronic signal image output 26 that is representative of the scene 22. A display 28 displays an image 12 in the second spectral band. A beam mixer 30 combines the image output 10 in the first spectral band with the displayed image 12, and conveys the combined multi-spectral images to an output 32 for a user U.

The image intensifier 14 provides an imager using known photo-cathode, multi-channel plate, and phosphor screen technology. Visible and near infrared light is collected by an optical element (objective) 34 and is focused onto the photo-cathode 36, where photons are converted to electrons. The electrons are accelerated through the multi-channel plate 38, creating new electrons. The resultant multiplication of electrons land on a phosphor screen 40 where luminescence occurs. The image created 10 is passed through a fiber optic bundle 42 creating an optical imaging focal plane 44.

A known infrared camera 16 is used to convert infrared imagery into a visible image. Since the present invention can utilize any type of infrared camera, the description of converting infrared imagery into a visible image is not set out here. However, it is important that the output of the infrared camera is provided in a form that can be formatted for projection onto a display.

Preferably, the incoming path 46 for collecting incoming radiant energy for the image intensifier is separate from, but essentially parallel, to the incoming path 48 for the infrared camera.

A known, standard image intensifier 14 optical design is used with an additional beam mixer or splitter 30 component. The beam mixer 30 is a device that allows two optical channels to be combined. Using a dichroic coating 50, that permits 70% of the incident radiation to be transmitted and 30% to be reflected, two optical paths, which originate perpendicular to one another, are combined. In a preferred embodiment, the image intensifier's output 10 is positioned adjacent to the beam mixer/splitter 30 and is oriented in the optical path 52 that corresponds to the 70% transmission through the beam mixer. The display 28 is positioned adjacent to the beam mixer 30, is oriented in the optical path 54 that corresponds to the 30% reflection, and is perpendicular to the image intensifier path 52.

The two images 10, 12 are projected through the beam mixer 30 optical path where a combined (fused) image 56 is provided as an output of the beam splitter 30.

An optical lens (eyepiece) 58 provides the ability to focus on the beam mixer/splitter providing the combined image to a user's eye 60.

The final product of the present assembly results in a fused multi-spectral optical overlay image.

The dichroic coating 50 of the beam splitter is generally placed on the 45-degree surface that allows the two optical paths to be combined. The night vision goggle's (NVG) optics provides an equivalent optical path through the eyepiece to the image intensifier and through the eyepiece to the display.

It is preferred that an Organic Light Emitting Diode (OLED) is used to project the digitized IR camera data. The OLED device provides a robust, integrated design that requires minimal power, and does so under a full military type temperature range. Other known types of displays 28 often either lose performance as the ambient temperature is lowered or require a heating element to keep its temperature at acceptable levels to meet performance requirements. The use of the OLED in the NVG is ideal for minimizing power, which is critical and rationed for extended battery life, across the full NVG operational temperature ranges.

The OLED's format and size is designed so that when projected through the beam splitter, the image intensifier's output circumscribes the display's rectangular format. This allows the fused image to reside in the central portion of the user's field of view. An alternative is considered whereas the image intensifier's output is inscribed in the display.

Alternative designs for the beam splitter eyepiece design may be used whereas the display has a format that is either larger or smaller than that required for the direct overlay fusion onto the image intensifier's output. In this case, a fiber optic bundle with taper or enlarger, a field flattener or magnifier, or other optical device that would magnify or shrink the display's format so that it would fit within the required image intensifier's output would be used. Again, the projected display image may either be inscribed or circumscribed by the image intensifier's (II) output.

The present invention further optionally uses a push button control 62 and associated micro-electronic function 64 for operation of image intensifier 14 and IR display 28 brightness. A micro-controller 64 may be packaged within the NVG to provide a broad spectrum of features to the user. First, the micro-controller 64 may control the brightness of both the image intensifier 14 and the display 28. In changing the brightness of the two separate images, the user U is able to determine the best mix within the fused image for optimal viewing. With the micro-controller's programmable feature, the user U is able to determine which method of mixing he would like to use.

Several variations in the type of image fusion mixing may be used. One such method is where the display brightness and the image intensifier brightness are controlled in a double ramp fashion. Starting in the middle, both components' brightness is set at 50% of their full brightness. As the user U pushes on one button, the display's brightness ramps to 100% (full on) while the II's brightness ramps to 0% (off). From this point, if the user U pushes another button, the brightness of the display ramps back down while the II's brightness ramps up; Ramping continues back to the 50/50 point and continues until the displays brightness is at 0% (off) and the II's brightness is full on.

The microcontroller 64 may also monitor the voltages from the batteries 66 and provides warning lights to the user when batteries are low. Since the IR camera 16 is the biggest power load on the batteries, the micro-controller 64 provides the user U a few minutes of operation after the low light indicator is turned on. After that point, the IR camera 16 may be turned off and the image intensifier 14 may be left on allowing the user U to continue with just image intensifier operation for another two hours. This feature provides the user to "limp home" to retrieve new battery resource or replacement.

Figure 2:
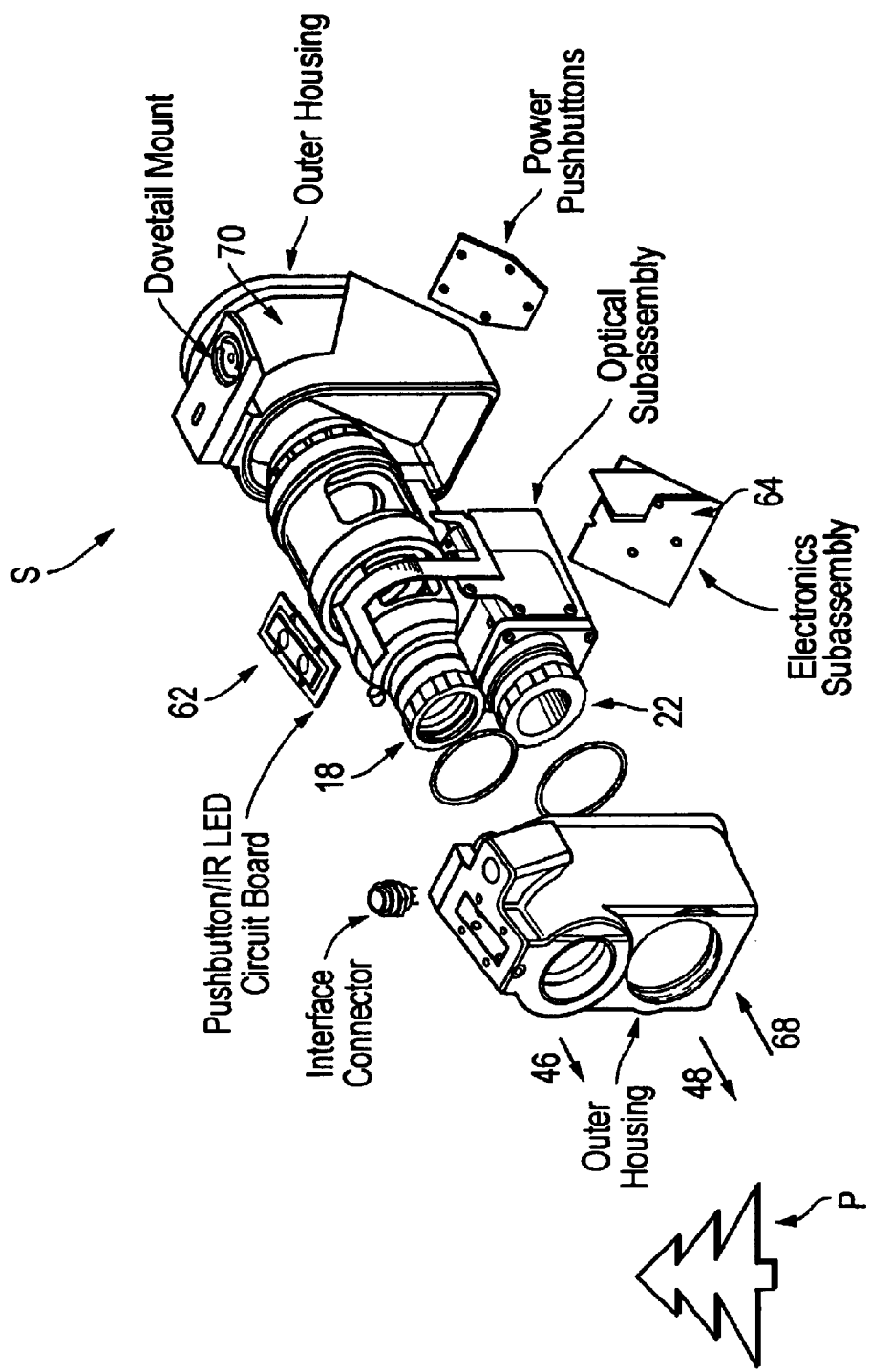
FIG. 2 is an exploded view of one embodiment of the present goggle design.
Figure 3:
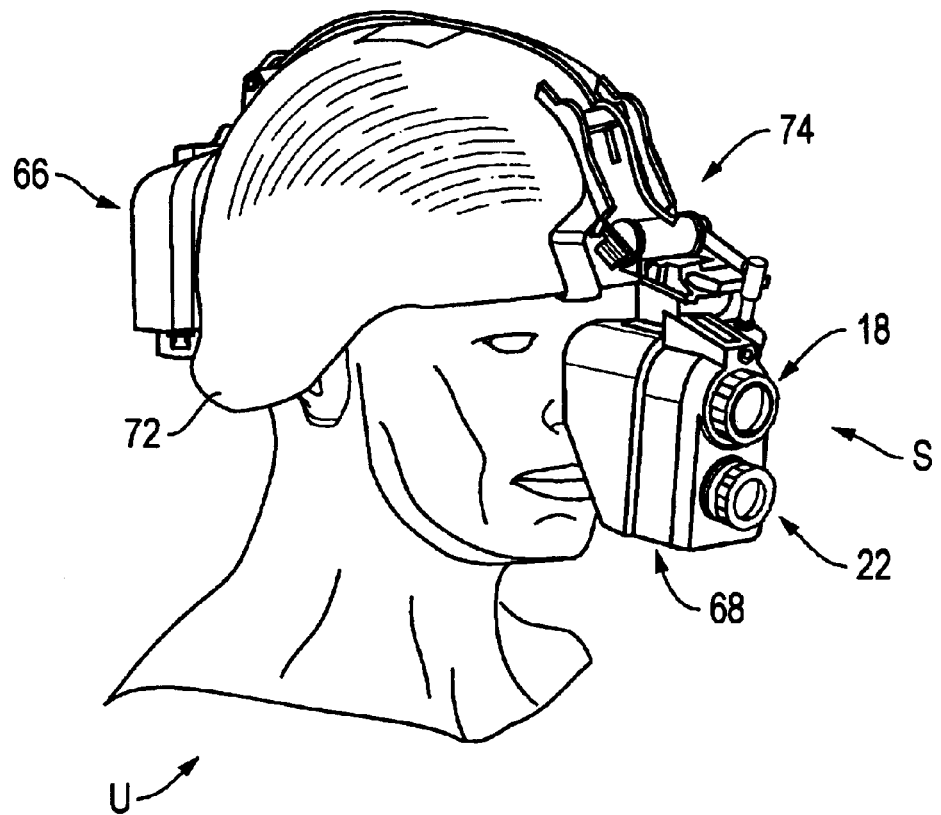
FIG. 3 depicts a user wearing a goggle of the present design.
Figure 3:
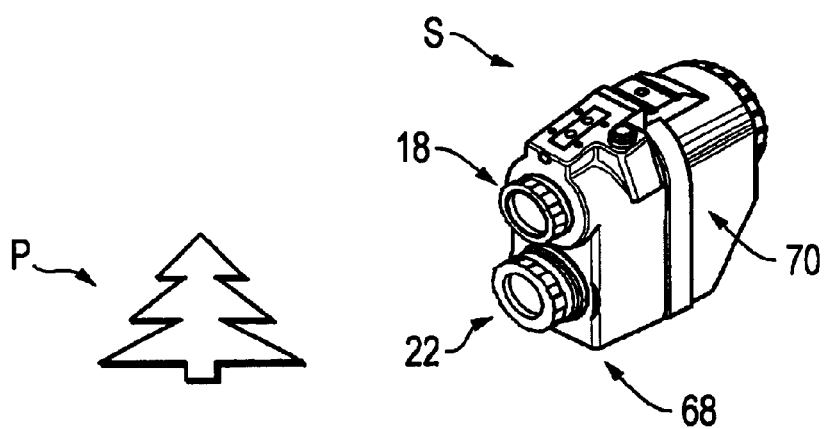

Referring to FIGS. 2 and 3 one embodiment of a man-portable NVG S of the present invention is shown mounted within a housing assembly including a first or frontal section 68 that mates with a rear housing segment 70. The scene to be observed P is represented within the general optical alignment of the first channel 18 and the second channel 22.

In FIG. 3, the present NVG S is depicted attached to a helmet 72 using a helmet mount 74.

The foregoing disclosure and description of the invention are illustrative and explanatory thereof, and various changes in the size, shape and materials, as well as in the details of the illustrated construction may be made without departing from the spirit of the invention.

What is claimed is:

1. A system for combining multi-spectral images of a scene, the system comprising:
    a channel for transmitting a scene image in a first spectral band in a first optical path;
    a separate second detector for sensing the scene in a second spectral band in a second optical path, the second detector having an image output representative of the scene;
    a display for receiving the image output of the second detector, and displaying an image from the second spectral band; and
    a beam mixer for combining the image output in the first spectral band with the displayed image, and conveying the combined multi-spectral images to an output.

2. The invention of claim 1 wherein the beam mixer includes a dichroic coating.

3. The invention of claim 1 wherein an output path of the display is essentially perpendicular to the first optical path.

4. The invention of claim 1 wherein the system is man-portable.

5. The invention of claim 1 wherein the system is helmet mounted.

6. The invention of claim 1 wherein the image displayed by the display of the second spectral hand channel is essentially perpendicular to the image transmitted by the channel for the first spectral band.

7. The invention of claim 1 wherein the display includes a transparent Organic Light Emitting Diode (OLED).

8. The invention of claim 1 wherein the first optical path includes an image intensifier.

9. A system for combining multi-spectral images of a scene, the system comprising:
    a channel for transmitting a scene image in a first spectral band in a first optical path;
    a separate second detector for sensing the scene in a second spectral band in a second optical path, the second detector having an image output representative of the scene;
    a display for receiving the image output of the second detector, and displaying an image from the second spectral band; the display includes a transparent Organic Light Emitting Diode (OLED); and
    a beam mixer for combining the image output in the first spectral band with the displayed image, and conveying the combined multi-spectral images to an output.

10. The invention of claim 9 wherein the beam mixer includes a dichroic coating.

11. The invention of claim 9 wherein an output path of the display is essentially perpendicular to the first optical path.

12. The invention of claim 9 wherein the system is man-portable.

13. The invention of claim 9 wherein the system is helmet mounted.

14. The invention of claim 9 wherein the image displayed by the display of the second spectral band channel is essentially perpendicular to the image transmitted by the channel for the first spectral band.

15. The invention of claim 9 wherein the first optical path includes an image intensifier.

* * * * *